(12) United States Patent
Wiora et al.

(10) Patent No.: US 7,236,240 B1
(45) Date of Patent: Jun. 26, 2007

(54) TIME-RESOLVED PHOTOGRAMMETRIC MEASUREMENT OF WHEEL POSITION VALUES

(75) Inventors: Georg Wiora, Stuttgart (DE); Marcus Ziegler, Munich (DE)

(73) Assignee: DaimlerChrysler AG, Stuttgart (DE)

( * ) Notice: Subject to any disclaimer, the term of this patent is extended or adjusted under 35 U.S.C. 154(b) by 660 days.

(21) Appl. No.: 10/048,605

(22) PCT Filed: Aug. 1, 2000

(86) PCT No.: PCT/DE00/02539

§ 371 (c)(1),
(2), (4) Date: Jun. 18, 2002

(87) PCT Pub. No.: WO01/11313

PCT Pub. Date: Feb. 15, 2001

(30) Foreign Application Priority Data

Aug. 5, 1999 (DE) .................................. 199 37 035

(51) Int. Cl.
*G01B 11/26* (2006.01)
(52) U.S. Cl. ................................... 356/139.09
(58) Field of Classification Search ............ 356/139.09, 356/155
See application file for complete search history.

(56) References Cited

U.S. PATENT DOCUMENTS

| | | | | |
|---|---|---|---|---|
| 5,675,515 A | * | 10/1997 | January | 700/279 |
| 5,731,870 A | * | 3/1998 | Bartko et al. | 356/139.09 |
| 5,841,146 A | * | 11/1998 | Briese | 250/493.1 |
| 5,870,315 A | | 2/1999 | January | 364/528.14 |
| 6,043,875 A | * | 3/2000 | Samuelsson | 356/139.09 |

(Continued)

FOREIGN PATENT DOCUMENTS

DE 197 57 760 7/1999

(Continued)

OTHER PUBLICATIONS

W. Blumenfeld & W. Schneider, Opto-elektronisches Verfarhen zur Spur- und Sturzwinkelmessung am fahrenden Fahrzeug (An Opto-Electronic Method of Measuring Toe-in and Camber Angles on a Moving Vehicle), ATZ Automobiltechnische Zeitschrift 87 (1985) 1, pp. 17 to 20, English summary.

(Continued)

*Primary Examiner*—Thomas H. Tarcza
*Assistant Examiner*—Luke D. Ratcliffe
(74) *Attorney, Agent, or Firm*—Davidson, Davidson & KAppel, LLC

(57) ABSTRACT

The invention concerns a device for three-dimensional photogrammetric capture of an object with time resolution, comprising a first auxiliary assembly set on the object to be captured, a second auxiliary assembly and a single camera. The first auxiliary assembly is mobile relative to the second auxiliary assembly. The camera is placed, relative to the first and second auxiliary assemblies, so as to capture a relative movement between said two auxiliary assemblies and hence the position of the object according to a single perspective. The inventive method is characterised in that it comprises the following steps: preparing a first auxiliary assembly set on the object to be captured; preparing a second auxiliary assembly, relatively to which the object can move; and capturing, according to a single perspective, the relative position of the object, on the basis of the initial position of the first and second assemblies.

5 Claims, 5 Drawing Sheets

U.S. PATENT DOCUMENTS 6,134,792 A * 10/2000 January .................. 33/203.18

FOREIGN PATENT DOCUMENTS

| DE | 197 57 763 | 7/1999 |
| DE | 19757760 | 7/1999 |
| DE | 19757763 | 7/1999 |
| EP | 0 880 009 | 11/1998 |
| EP | 0880009 | 11/1998 |

OTHER PUBLICATIONS

Basics of Photogrammetry, available at www.geodetic.com/Basics.htm accessed and printed on Jul. 21, 1999.

* cited by examiner

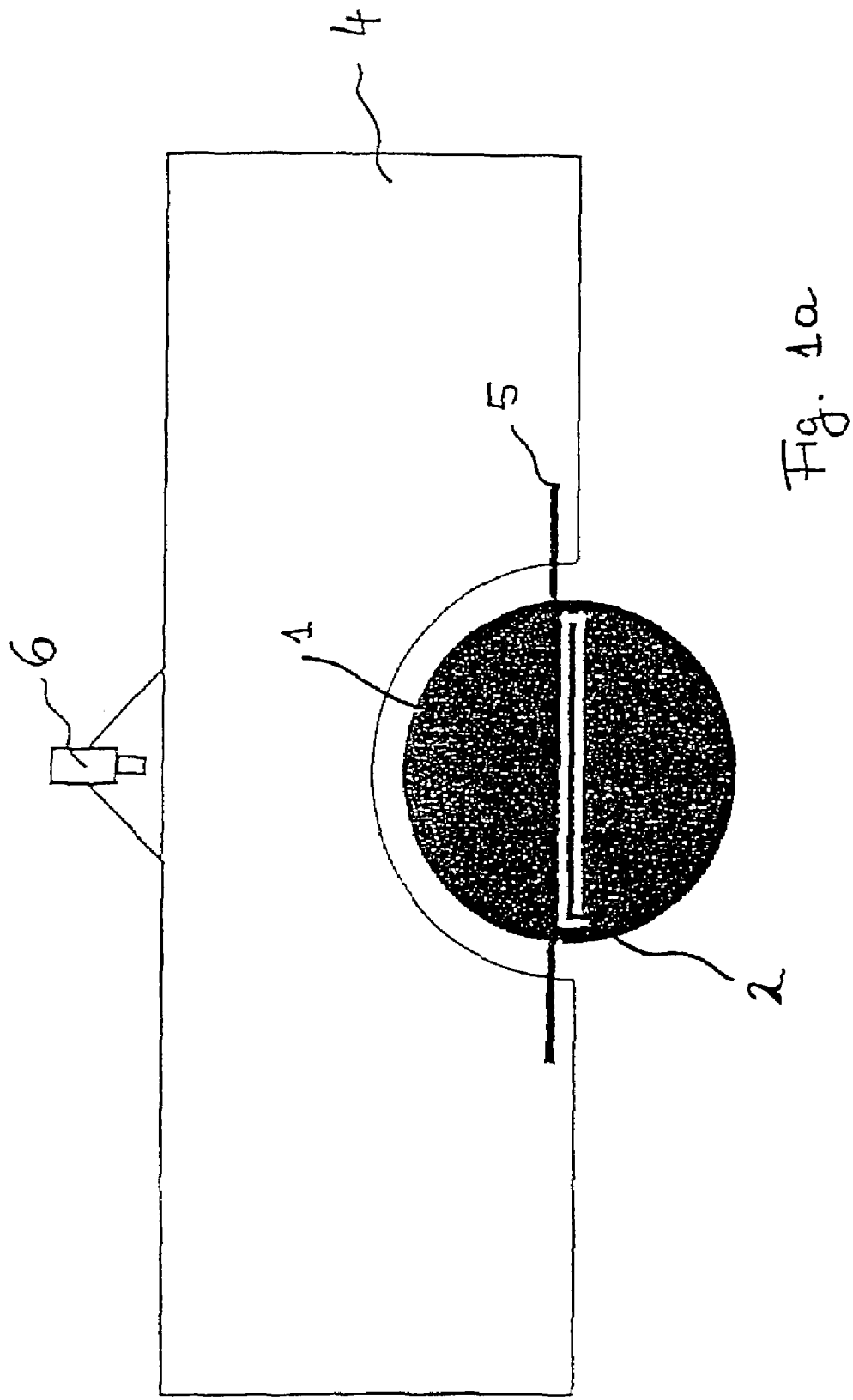

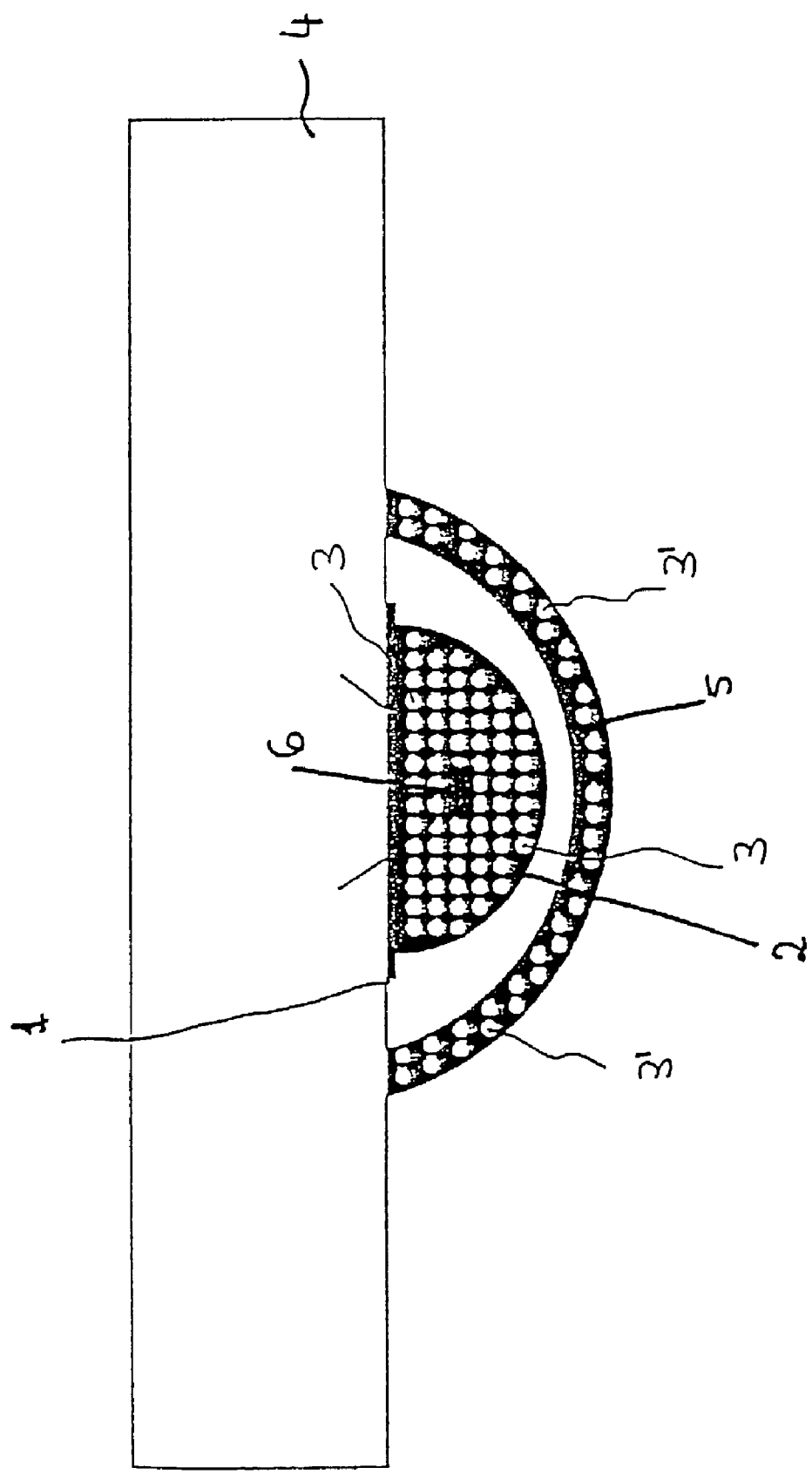

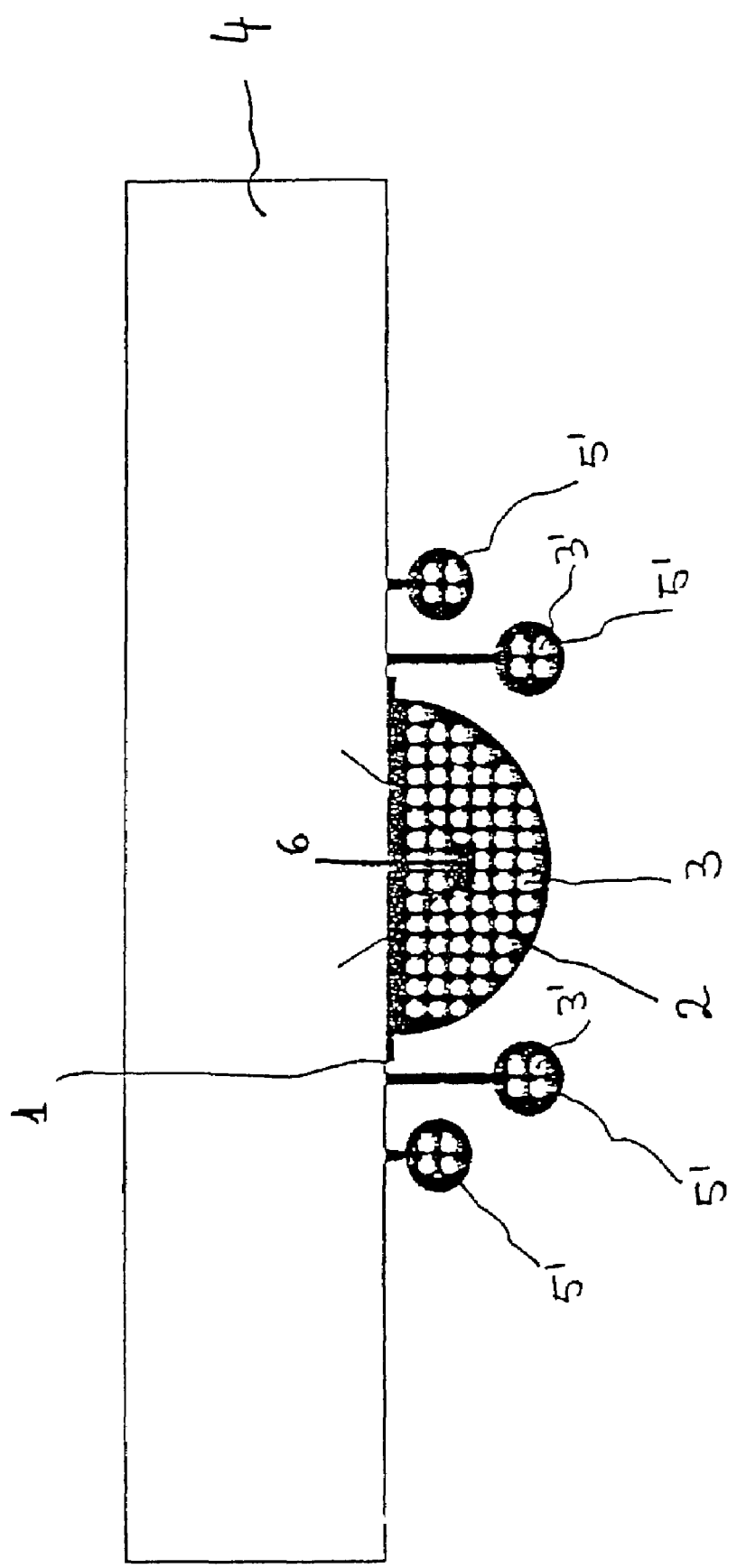

TIME-RESOLVED PHOTOGRAMMETRIC MEASUREMENT OF WHEEL POSITION VALUES

The present invention relates in general to a method and a device for three-dimensional, time-resolved photogrammetric capture of an object and in particular to a method and a device for time-resolved photogrammetric measurement of the three-dimensional wheel position of a vehicle in travel operation.

A device for determining the wheel and/or axle geometry of motor vehicles via an optical measuring device is known from German Patent Applications DE-A 1-197 57 760 or DE-A 1-197 57 763. The optical measuring device is equipped with image recorders which record, from at least two different perspectives, the wheel or the axle to be captured. The known device includes, moreover, an arrangement for bearing reference markings which is attached between the measuring device and the wheel as well as additional wheel markings.

Therefore, the object of the present invention is to provide a device and a method via which the location and the orientation of an object in space can easily be determined in a highly precise and time-resolved manner. This and further objectives to be gathered from the following description are attained by a device and a method according to the enclosed claims.

The device and the method according to the present invention have the feature that the position of the object to be determined is determined relative to the position of a reference object, both the object to be determined and the reference object being marked by marks of arbitrary form and size. According to the present invention, the determination is carried out at a specific point in time by simultaneously recording the two objects via only one camera with only one image during which it is not required for the camera to have a fixed relation to the object to be determined or to the reference object. Using the present invention and device, respectively, it is possible for the steering angle, camber angle and spring travel of a vehicle to be determined reliably and with a high resolution.

The natural surface texture of the objects to be determined or of the reference object can be used as a mark. According to a preferred aspect of the present invention, one uses photogrammetric marks which are provided on the object to be determined and/or also on the reference object.

Further features and advantages can be gathered more clearly from the following description of the preferred exemplary embodiments of the present invention with reference to the enclosed Figures, of which FIG. 1a is a lateral view of the first embodiment of the device according to the present invention for three-dimensional, time-resolved photogrammetric capture of an object;

FIG. 1b shows a top view of the first embodiment;

FIG. 2b depicts a top view of the second embodiment.

Although the present invention is illustrated in connection with the measurement of the three-dimensional wheel position during the travel operation of a vehicle, one skilled in the art will, of course, understand that the basic concept of the invention can be used for any dynamic or static capturing of objects.

Figure 1C:
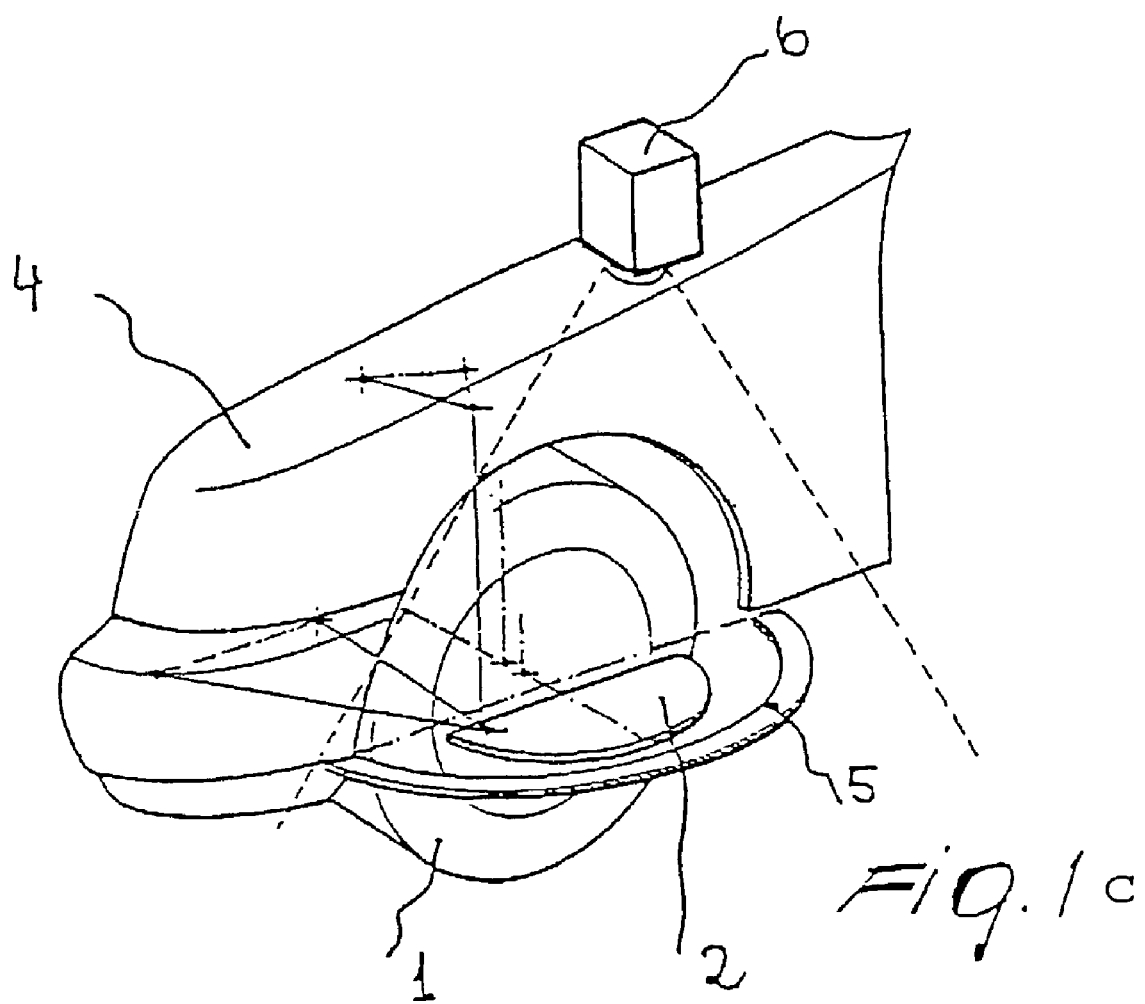
FIG. 1c is a perspective view of the device of FIGS. 1a and 1b.

With reference to FIGS. 1a through 1c, a first auxiliary assembly 2 is attached to wheel 1 to be measured in such a manner that the auxiliary assembly remains stationary relative to the wheel axle, which is not shown (for example, by attachment to the wheel hub). It is particularly advantageous for first auxiliary assembly 2 to be formed from a light, dimensionally stable material. First auxiliary assembly 2 fulfils the function of a stiff carrier to which an appropriate number of photogrammetric marks 3 are applied if the intention is to use marks of that kind. Marks 3 are discernible in FIG. 1b as white dots. First auxiliary assembly 2 is advantageously designed in a semicircular shape, as is also discernible in FIG. 1b.

Furthermore, a second auxiliary assembly 5 is attached to the body of partially shown vehicle 4 in such a manner that the auxiliary assembly remains stationary relative to the body of vehicle 4 during the measurement. Analogously to first auxiliary assembly 2, second auxiliary assembly 5 can preferably be formed from a light, dimensionally stable material as well.

In the embodiment of FIG. 1b, second auxiliary assembly 5 takes the form of a bow which spans around semicircular first auxiliary assembly 2. The first and second auxiliary assemblies can be essentially contained in a single plane as shown but a offset arrangement is possible as well.

The above design advantageously permits free rotation of the wheel during travel operation. Second auxiliary assembly 5 serves as a carrier of an appropriate number of photogrammetric marks 3' as well if the intention is to use marks of that kind.

Auxiliary assemblies 2 and 5 are positioned relative to each other in such a manner that they can be recorded over their full surface, if possible, in each driving situation by a camera 6 which is attached above to vehicle 4. According to a preferred aspect of the present invention, camera 6 is flexibly attached to the body. Applicant's tests revealed that particularly good results can be attained using a high-speed camera having a resolution of 512*512 pixels. It is possible to provide a stroboscopic illumination (not shown) for the camera.

Basically, it is only required for camera 6 to be arranged so as to be able to "see" both auxiliary assemblies 2 and 5 at the same time. There is no need for a fixed relation to any of the two auxiliary assemblies. Therefore, it is not necessarily required for the camera to be attached to the vehicle body as shown in the Figures of the present patent application as long as it is guaranteed that the camera follows the movement of the vehicle or of the object to be captured.

Prior to the time-resolved photogrammetric capture, auxiliary assemblies 2 and 5 which are attached to wheel 1 and to the body and provided with marks 3 and 3', are initially recorded from different camera positions, and a simultaneous calibration of camera 6 as well as a position determination of marks 3 and 3' are carried out using a standard method as described, for example, at http://www.geodetic.com/Basics.htm. Subsequently, the actual time-resolved, photogrammetric capture begins for which only recordings from one camera position are required.

The images picked up by camera 6 are recorded on a storage medium (not shown) which is suitable for the resulting data volume and evaluated off-line upon completion of the measurement, using standard methods of photogrammetry (single-camera system). An on-line evaluation is conceivable as well provided that suitable computation means are available. The storage medium must have sufficient capacity for data volumes which are usual for applications of that kind. The evaluation of the recorded image data can be carried out using a special hardware or a suitable PC.

During this evaluation, one image containing the simultaneous recording of the two objects (wheel 1 and body) and of the two auxiliary assemblies 2 and 5 is subjected to the so-called "resection method" (without beam compensation) at a time, this method being separately applied for the two auxiliary assemblies 2 and 5, respectively. In each case, the dot coordinates of marks 3 and 3' and a (virtual) position of the camera are determined, respectively. Finally, a transformation into a common coordinate system takes place in which the relative position of the two objects is known (upon calculation).

Applicant's tests revealed that suitable results can be attained with the above-mentioned camera resolution, the camera and the downstream evaluation electronics were able to carry out up to 160 measurements per second. Depending on the particular requirements, it would thus be possible to carry out up to approximately 200000 individual measurements within an uninterrupted time span of 20 minutes.

The method according to the present invention lies in that the relative position (location and orientation) of the two auxiliary assemblies 2 and 5 to each other can effectively be determined via camera 6 and the downstream evaluation. In this context, it is not required for camera 6 to be fixed relative to one of auxiliary assemblies 2 or 5. Possible vibrations are irrelevant here.

If the original position of both auxiliary assemblies is known, for example, with respect to a null position of the vehicle coordinates, then the wheel position can be exactly determined at each instant of the measurement provided that the fixed relation of second auxiliary assembly 5 to the body can be guaranteed. The reference relation to the body is a basic problem of any measurement set-up. This problem is solved by the present invention in a particularly advantageous manner by manufacturing second auxiliary assembly 5 with an extremely low mass and high stiffness (i.e., the smallest possible intrinsic movements). For both auxiliary assemblies, it is preferred to use a carbon-fiber reinforced plastic (CFK) which meets the above requirements. However, other materials of comparable stability are conceivable as well.

Figure 2A:
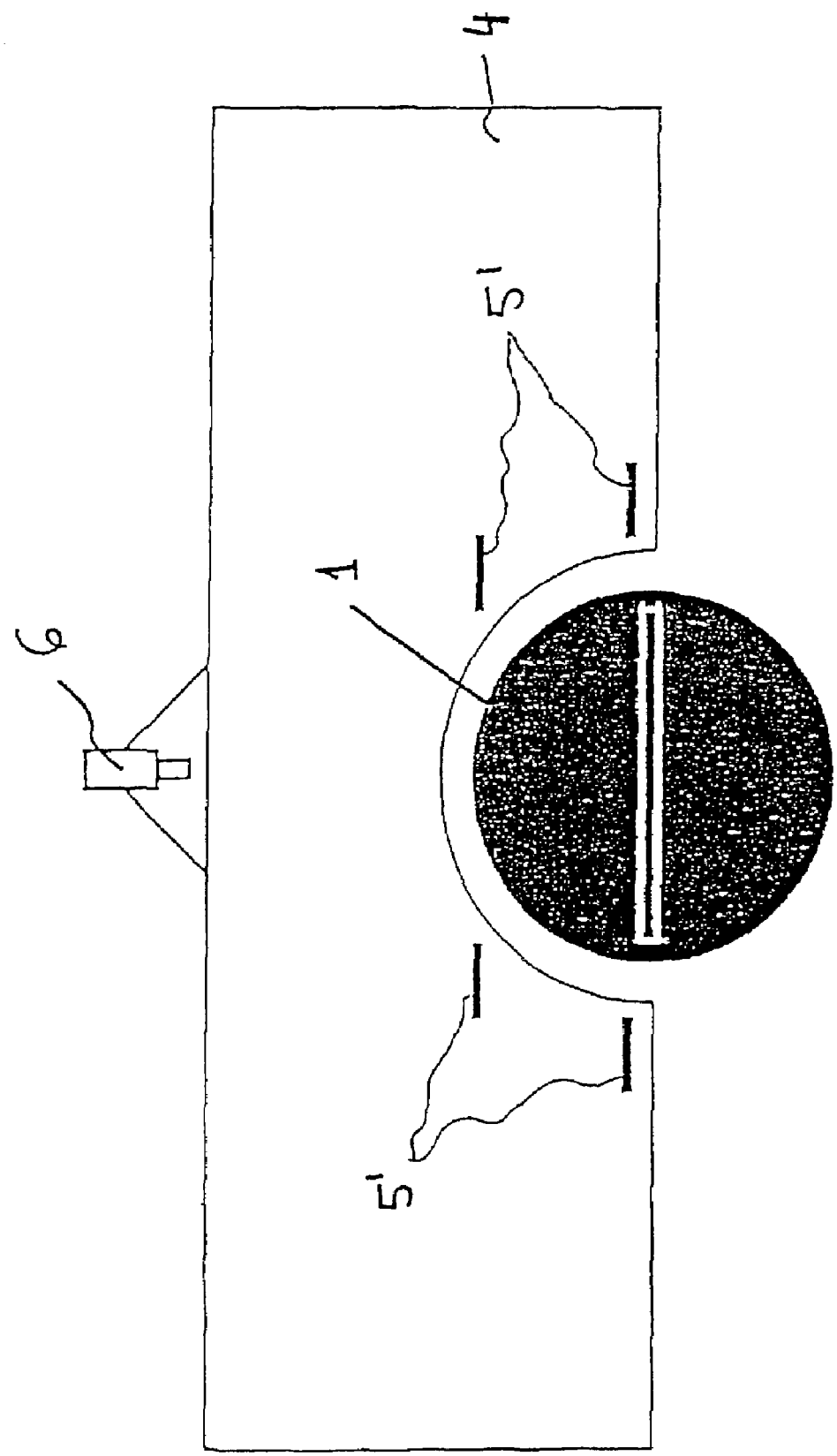
FIG. 2a is a lateral view of the second embodiment of the device according to the present invention for three-dimensional, time-resolved photogrammetric capture of an object.

The second embodiment of the present invention will be explained with reference to FIGS. 2a and 2b. Unlike the first embodiment, second auxiliary assembly 5' is formed of a plurality of individual components which are attached to the body in one or several planes. In FIG. 2a, two of the individual components are situated in a plane which corresponds approximately to the plane of first auxiliary assembly 2, whereas the other two individual components lie in a plane above the wheel circumference.

According to a particularly advantageous aspect of the present invention, the second embodiment additionally offers the possibility of monitoring the position of these individual components relative to each other, which should ideally not change, thus acquiring data on possible natural vibrations.

What is claimed is:

1. A device for three-dimensional, time-resolved photogrammetric capturing of a moving object, comprising:
a first and a second dimensionally stable auxiliary assembly suitable for photogrammetric capturing, and
a single camera,
the first auxiliary assembly being attached to an object to be recorded when moving;
the first auxiliary assembly being movable relative to the second auxiliary assembly;
the first and the second auxiliary assemblies being movable relative to the camera;
the camera being arranged relative to the first and second auxiliary assemblies so as to record a relative movement thereof and thus determine a position of the object from a single perspective;
wherein the object is a wheel of a vehicle and the position is a three-dimensional position of the wheel during travel operation, the first auxiliary assembly being attached to the wheel, the second auxiliary assembly being attached to a body of the vehicle, the camera being attached to the body of the vehicle; the camera being arranged relative to the first and second auxiliary assemblies so as to capture a relative movement thereof and thus the position of the wheel.

2. A device for three-dimensional, time-resolved photogrammetric capturing of a moving object, comprising:
a first and a second dimensionally stable auxiliary assembly suitable for photogrammetric capturing, and
a single camera,
the first auxiliary assembly being attached to an object to be recorded when moving;
the first auxiliary assembly being movable relative to the second auxiliary assembly;
the first and the second auxiliary assemblies being movable relative to the camera;
the camera being arranged relative to the first and second auxiliary assemblies so as to record a relative movement thereof and thus determine a position of the object from a single perspective;
wherein the first auxiliary assembly is designed in a semicircular shape and the second auxiliary assembly is a bow surrounding the first auxiliary assembly.

3. A device for three-dimensional, time-resolved photogrammetric capturing of a moving object, comprising:
a first and a second dimensionally stable auxiliary assembly suitable for photogrammetric capturing, and
a single camera,
the first auxiliary assembly being attached to an object to be recorded when moving;
the first auxiliary assembly being movable relative to the second auxiliary assembly;
the first and the second auxiliary assemblies being movable relative to the camera;
the camera being arranged relative to the first and second auxiliary assemblies so as to record a relative movement thereof and thus determine a position of the object from a single perspective;
wherein the first auxiliary assembly is designed in a semicircular shape and the second auxiliary assembly includes a plurality of individual components.

4. The device as recited in claim 1 wherein the first auxiliary assembly is designed in a semicircular shape and the second auxiliary assembly includes a plurality of individual components having a substantially circular shape and attachable to the body.

5. A method for three-dimensional, time-resolved photogrammetric capturing of a moving object, comprising:
providing a first and a second dimensionally stable auxiliary assembly suitable for the photogrammetric capturing and providing a camera;
attaching the first auxiliary assembly to an object to be recorded when moving; and arranging the second auxiliary assembly in such a manner that both auxiliary assemblies can be recorded from a single perspective;

the first auxiliary assembly being movable relative to the second auxiliary assembly;

the first and second auxiliary assemblies being movable relative to the camera;

calibrating the camera;

capturing the relative position of the object from a single perspective on the basis of an original position of the first and second auxiliary assemblies;

wherein the object is a wheel of a vehicle during travel operation, wherein the first auxiliary assembly is attached to the vehicle wheel to be recorded and the second auxiliary assembly is attached to the body of the vehicle; the camera being attached to the body of the vehicle, the relative position of the wheel being recorded from the single perspective on the basis of an original position of the first and second auxiliary assemblies.

* * * * *